Dec. 14, 1965   W. L. LIVINGSTON   3,223,326
METHOD AND APPARATUS FOR CONTROLLING COMBUSTION
Filed Dec. 20, 1961   5 Sheets-Sheet 1

FIG. 1

INVENTOR:
WILLIAM L. LIVINGSTON
BY
AGENT

INVENTOR:
WILLIAM L. LIVINGSTON
BY
AGENT

Dec. 14, 1965  W. L. LIVINGSTON  3,223,326
METHOD AND APPARATUS FOR CONTROLLING COMBUSTION
Filed Dec. 20, 1961  5 Sheets-Sheet 5

INVENTOR:
WILLIAM L. LIVINGSTON
BY
AGENT

United States Patent Office 3,223,326
Patented Dec. 14, 1965

3,223,326
METHOD AND APPARATUS FOR CONTROLLING COMBUSTION
William L. Livingston, Bloomfield, Conn., assignor to Combustion Engineering, Inc., Windsor, Conn., a corporation of Delaware
Filed Dec. 20, 1961, Ser. No. 160,875
6 Claims. (Cl. 236—14)

The invention relates to steam power plants and is more specifically concerned with an improved apparatus and method of controlling combustion in a furnace chamber that is associated therewith. The invention is primarily directed to a combustion control system for furnaces which are being fired with oil, gas or other fuel burned in suspension, however can also be adapted with great benefit to furnaces firing fuel by other means.

In modern steam power plants, generating steam in excess of 1,000,000 lbs. of steam per hour, tremendous quantities of fuel are consumed. It is therefore of primary importance that the fuel be burned with the highest possible efficiency under fluctuating load conditions. Various means have been employed heretofore to gauge the efficiency and completeness of combustion and to control the ratio of fuel to air that is most favorable for attaining complete combustion. Such means included fuel measuring devices, air flow recorders, flue gas analyzers, $CO_2$ recorders, and $O_2$ and combustible indicators and others. With these instruments, the fuel and air for combustion is metered and the efficiency of combustion is determined by gas probes measuring the relative quantity of carbon dioxide, oxygen and combustibles in the flue gases. When regulating combustion of fuel for various loads in accordance with these methods as heretofore practiced, indications of combustion efficiency are only obtained after the fuel is burned and after the gases have been washed and analyzed. Furthermore incomplete combustion such as is reflected in the solid combustibles present in the fly ash or other ash residue must be separately evaluated to arrive at an accurate and dependable measure of combustion efficiency. Such measurements are subject to inaccuracies and considerable delay before any corrective actions can be taken and are effective in improving the efficiency of combustion.

The present invention discloses an apparatus for controlling combustion in accordance with heat demand in a manner which largely eliminates delay in the control action. In the disclosed system a measure of the efficiency of combustion as reflected in a combustion index is obtained directly from the flame body produced in the furnace chamber, and while combustion actually is in progress and not after the burning process is completed, as in the case when a flue gas analyzer is employed to measure combustion efficiency.

Various combustion efficiency indices can be employed in connection with the hereindisclosed control system such as combustion heat indicators which include thermocouple probes, measurements using the furnace as a calorimeter, electromagnetic wave emission indicators and gas density measurements such as the Delta P system.

Furthermore, the present invention permits control of combustion for varying heat demand in response to one of the above combustion indices, without the necessity of actually measuring fuel flow rate and air flow rate and without a direct determination of the fuel-air ratio.

It is therefore a primary object of the invention to provide an apparatus and method whereby combustion control impulses can immediately and directly be obtained from the flame envelope or burning gas body, with such impulses indicating whether or not combustion is proceeding at optimum efficiency, and if not, what corrective measure must be taken with respect to relative fuel flow or air flow to produce optimum efficiency.

Other objects and advantages of the invention will become apparent from the following description of an illustrative embodiment thereof when taken in conjunction with the accompanying drawings wherein.

Generally speaking, it can be stated that when analyzing a flue gas sample for determining the efficiency of a combustion process, an increase of $CO_2$ and a decrease of $O_2$ in the flute gas sample indicates an increase in the combustion efficiency. And an increase of combustible matter found in the products of combustion would indicate a decrease in the combustion efficiency. This knowledge has heretofore been made use of in obtaining a measure of combustion efficiency for combustion control.

In the hereindisclosed combustion control system, I have made use of the discovery that the combustion efficiency of a body of burning gases, whether such a body is of the luminous or nonluminous kind, is faithfully reflected by combustion indices that are based on impulses received directly from the body of combustion. Thus the present invention arises out of the observation that a combustion index of the kind earlier mentioned herein, in receiving impulses directly from the flame body or body of combustion, is characterized by an optimum index value that coincides with the optimum in combustion efficiency. Furthermore, once optimum combustion efficiency has been established, any change in the quantity of one of the elements supplied for combustion, such as air or fuel, will cause a decline in combustion efficiency, such decline being directly reflected by a corresponding decline in the combustion efficiency index value.

I have found that gas density measurements such as by the static pressure differential, also known as Delta P, observed between two locations in the combustion chamber when these locations are spaced in the gas flow sense can serve as a combustion efficiency index in an exceptionally advantageous manner. In my patent application, Serial No. 771,375, filed November 3, 1958, and refiled on June 19, 1962, as continuation application Serial No. 205,483, now Patent No. 3,123,027, I have shown how pressure differential indications between two points in a combustion chamber can be used for the purpose of determining the presence or absence of a flame. For a more detailed description of the principles underlying this my so-called pressure differential or Delta P sensing method attention is directed to the above-identified patent application. The present invention is based on the same basic observations, with the additional important observation that an optimum in combustion efficiency coincides with an optimum in pressure differential at any load and under any combustion conditions. This conclusion is based on the following facts: The pressure difference between a point upstream and a point downstream of the combustion zone is a function of the density of the gases at these points. Since the density is a function of the temperature, and the temperature a function of the heat released, and the heat released reflects the combustion efficiency for any given quantity of fuel, it follows that the pressure difference also is representative of the combustion efficiency. Thus the so-called Delta P method can advantageously be applied to adopting the combustion of fuel to varying heat demands while maintaining optimum efficiency of the combustion process.

Another combustion efficiency index which could be used with great benefit in connection with the invention is a photo cell. This instrument would in effect directly receive an indication of the temperature of the combustion body, with the optimum temperature being indicative of the optimum combustion efficiency.

Considering now the Delta P system in connection with my hereindisclosed novel combustion control method, the pressure differential between two spaced points in a chamber wherein combustion takes place is effected by two forces. First, the velocity of the gases of combustion leaving the chamber increases due to the higher volume of the burning gases. This produces a larger pressure at the fuel inlet of the chamber than at the gas outlet or at a point of the chamber downstream of the fuel inlet. An example of a combustion chamber wherein the above pressure differential is predominant is a burner igniting device or ignition torch such as that described in detail in the patent application referred to hereinabove.

The second force contributing to the pressure differential being produced between two spaced points in a combustion chamber is due to the so-called stack effect. This effect which is caused by the difference in temperature between the hot leg and the cold leg of the measuring circuit is most prominent in an upright combustion chamber.

Figure 1:
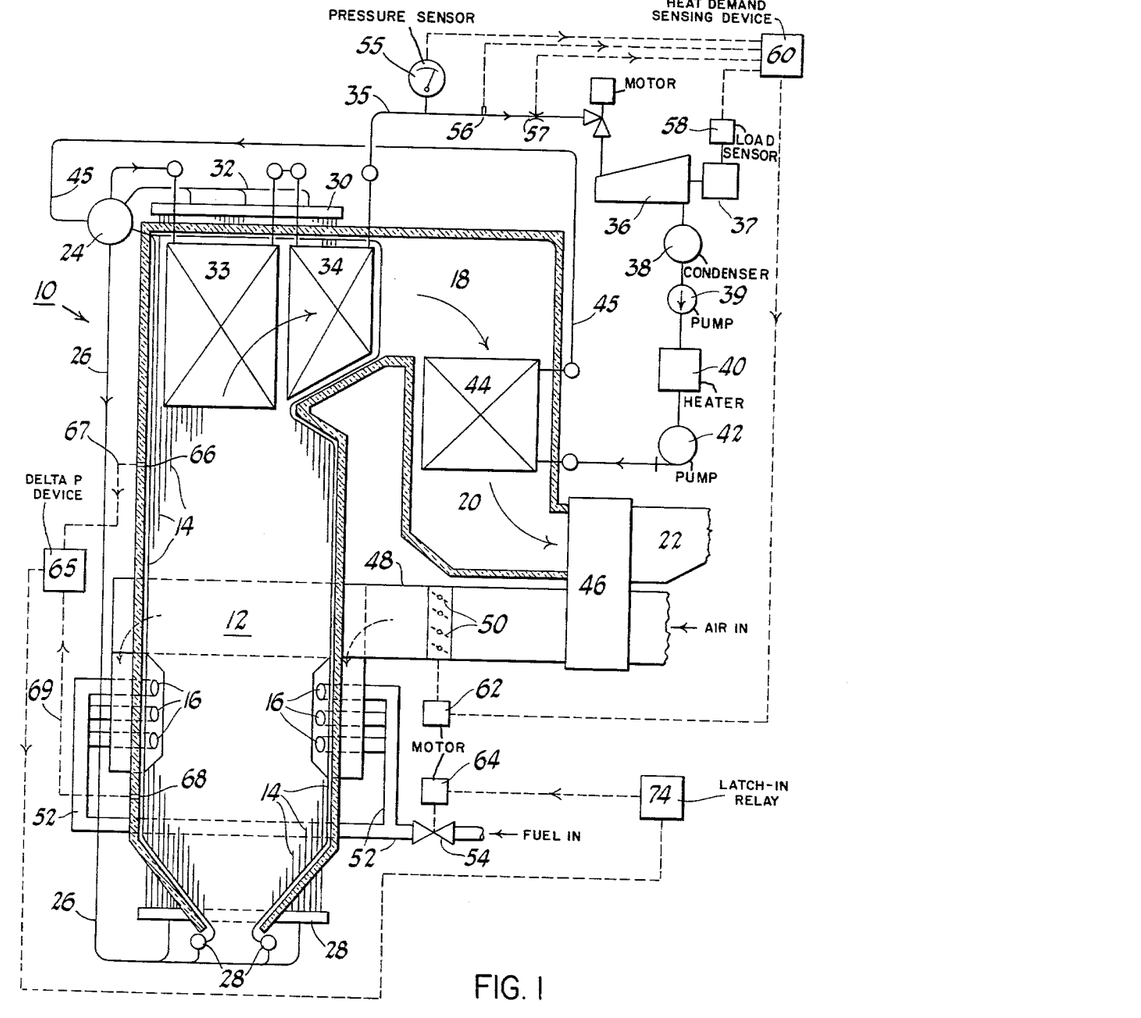
FIG. 1 is a diagrammatic illustration of a steam power plant having an upright furnace chamber equipped with the preferred embodiment of the inventive combustion control system.

My invention of controlling the combustion efficiency, as hereindisclosed in a vertically elongated combustion chamber as shown in FIG. 1, is based on a pressure differential caused primarily by the stack effect, with the earlier described effect, that is the one caused by an increase of the gas volume due to the burning process, having a minor influence on the pressure differential because of the relatively low velocity of the combustion gases. Accordingly, the pressure measured at the top of the upright furnace chamber will be larger than that measured at the lower portion thereof. An increase in pressure differential therefore will generally be indicated by a decrease in the static pressure measured near the bottom of the furnace, and vice versa.

Figure 2:
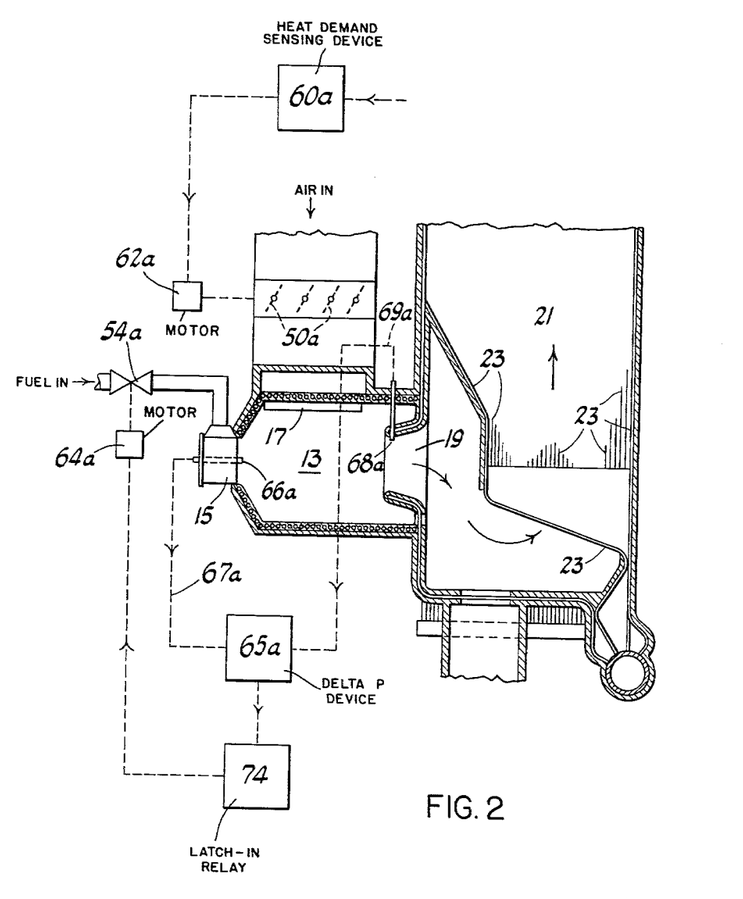
FIG. 2 is a diagrammatic illustration of a steam power plant having a horizontally arranged combustion chamber equipped with the preferred embodiment of my inventive combustion control system.

On the other hand my invention of controlling the combustion efficiency as hereindisclosed in a horizontally elongated combustion chamber as shown in FIG. 2, is based on a pressure differential caused primarily by an increase in gas volume and velocity as the gases leave the combustion chamber, with the stack effect being of no consequence. Accordingly, the pressure measured at a point downstream of the point of fuel ignition will be smaller than that measured at a point in the combustion chamber upstream of this downstream point. An increase in pressure differential or Delta P therefore will generally be indicated by an increase in the static pressure measured at the inlet to the combustion chamber.

Turning now to FIG. 1 showing one of the preferred embodiments of the invention, 10 designates a steam generator having a furnace chamber 12 defined by walls which are lined with water carrying heat absorbing tubes 14. Fuel and air for combustion is introduced into the furnace chamber 12 by way of burners 16, the combustion gases flowing upwardly and passing into a horizontal gas offtake pass 18, then into a downflow gas pass 20, and are discharged into the atmosphere by way of gas duct 22 and a stack not shown. The heat liberated by the burning of the fuel is partially absorbed by the furnace wall tubes 14 which are supplied with water from a steam and water drum 24 by way of downtake pipes 26 and waterwall inlet headers 28. Steam is generated in tubes 14 and a mixture of steam and water is discharged into drum 24 by way of waterwall outlet headers 30 and connecting pipe 32. After being separated from the water by separating means not shown, the steam is conducted to a radiant superheater 33 which is located in the upper portion of the furnace chamber 12, and hence into a convection superheater 34 located in the horizontal gas offtake pass 18. Having absorbed sufficient heat from the combustion gases to attain a predetermined superheated steam temperature the superheated steam is then piped by way of steam line 35 to a point of use such as steam turbine 36 driving an electric generator 37. With the heat energy in the steam having been turned into mechanical energy the exhausted steam passes from steam turbine 36 into a condenser 38 from which the condensate is pumped by means of condenser pump 39 via feedwater heater 40 and by means of feedwater pump 42 into an economizer 44. This economizer located in the downflow gas pass 20 is designed to heat the feedwater to a temperature approaching saturation temperature before the feedwater is conducted into steam and water drum 24 by means of pipe 45. In steam and water drum 24 the feedwater mixes with the water that is being discharged into drum 24 from waterwall tubes 14 as earlier described. The water thereupon flows through downcomer pipes 26 into the furnace wall tubes 14 by natural circulation or by forced circulation, not shown, thereby completing the water circulating and steam producing cycle.

An air heater 46 is provided in the gas stream at a location downstream of the economizer 44 for the purpose of absorbing heat from the gases to heat the combustion air prior to supplying this air to the burners 16 by way of air duct 48. A damper 50 is arranged in duct 48 for the purpose of controlling the flow of air to the furnace. Fuel is delivered to burners 16 by way of fuel pipes 52 with a fuel valve 54 being provided for controlling the supply of fuel to the furnace chamber 12.

In a conventional combustion control system the fuel and air supply together with the feedwater supply must be matched with the load demand or heat demand. The load demand can be sensed in various ways, all conventional, such as by way of variations in steam pressure, steam temperature, steam flow, or electric power output. A number of conventional devices utilizing the above variations are indicated in FIG. 1, such as steam pressure recording device 55, steam temperature measuring device 56, steam flow sensing device 57, and instrument 58 for indicating the electric load requirement of the electric generator 37. Any one of these devices or other means may be used to sense the load demand or heat output demand of the steam power plant, and to furnish corresponding impulses to a heat demand sensing device 60 such device being of well known and commercially available design. An air damper activating device or air controller 62 and a fuel valve activating device or fuel controller 64 are provided to receive impulses for adjusting the air or fuel supply to the furnace, in sufficient quantities to meet the heat demand.

In accordance with the invention, a pressure differential recorder or Delta P device 65 is made use of for sensing the static pressure differential between at least two pressure tap points 66 and 68 located in the wall of the combustion chamber and spaced from each other in the gas flow sense. Although the pressure tap 68 is shown as being located upstream of the point of fuel and air introduction which location is the preferred one, the invention could be practiced with equal beneficial results if pressure tap 68 were located downstream of the fuel and air inlet of burners 16, but still upstream of pressure tap 66.

In FIG. 2 my invention is applied to a steam boiler having a horizontally elongated combustion chamber 13 with the gases generally flowing in a horizontal direction. Fuel is introduced in an axial direction by way of burner 15, and combustion air in a tangential direction by way of air inlet 17. The burning gases leave the combustion chamber 13 at high velocity by way of outlet 19 and enter a radiation chamber 21 lined with water carrying and steam generating tubes 23. The pressure differential or Delta P device 65a is similar to the device used with the organization illustration in FIG. 1, also the fuel controller 64a activating fuel valve 54a and the air controller 62a activating air dampers 54a are devices performing the same functions as devices 64 and 62, respectively. Likewise the heat demand device 60a is similar to device 60 utilized in the steam power plant of FIG. 1. The pressure taps 66a and 68a serve the same function as pressure taps 66 and 68. However in the embodiment shown in FIG. 2, the pressure measured at point 66a is generally higher than that measured at point 68a.

Figure 3:
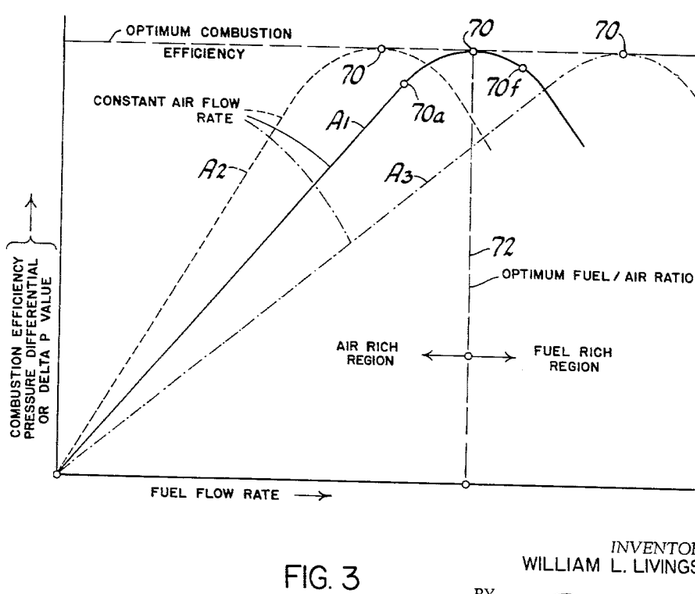
FIG. 3 is a diagram showing various constant air flow quantity parameters plotted against fuel flow rate as the abscissa, and combination efficiency or a combustion efficiency index in the form of the pressure differential as the ordinate, with a line drawn through the most efficient air flow-fuel flow ratio dividing the diagram into an air-rich region and a fuel-rich region.

In FIG. 3 are shown curves A1, A2, A3 of various constant air flow values in pounds per hour, for example. These curves are plotted against varying fuel flow rates and varying combustion efficiencies as expressed by pressure differential or Delta P values measured between pressure taps 66 and 68 or by some other combustion efficiency index such as a photo cell. The apex 70 of these curves indicates a practical optimum of combustion efficiency and the corresponding fuel-air ratio producing such optimum efficiency which would coincide with a maximum of pressure differential or Delta P value. Thus, for any given air flow quantity there is a definite fuel flow quantity which results in a practical optimum combustion efficiency and which is reflected by a maximum pressure differential value. With respect to air flow A, line 72 indicates the most efficient fuel and air proportions with the region to the right of line 72 representing a fuel-rich mixture, and the region to the left of line 72 an air-rich mixture.

Figure 4:
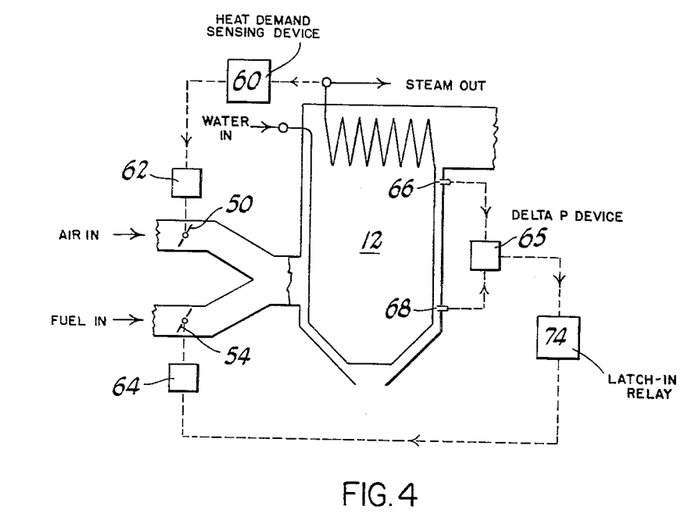
FIG. 4 is a simplified diagrammatic representation of the herein disclosed improved combustion control system, with heat demand determining air flow rate, and fuel flow rate being matched to air flow by means of pressure differential indications.

Turning our attention now to FIG. 4 which shows the preferred inventive combustion control system in a diagrammatic form, heat demand impulses of the steam generator received by heat demand device 60 in the manner earlier described herein, are sent forth to an air flow controlling device 62 activating air damper 50. Thus, with an increase in heat demand the air flow is increased correspondingly. Such increase will either raise or lower the combustion efficiency in the furnace 12, which change will be reflected in an increase or decrease in the differential pressure recorded by device 65 and as sensed by pressure taps 66 and 68. If the burning of fuel had been proceeding at maximum efficiency as illustrated by point 70, see FIG. 3, and before a change in heat demand was called for by heat demand device 60, then a lowering of the combustion efficiency will take place with an increase in air supply, such as denoted by point 70a located on curve A1 of FIG. 3, and a corresponding drop in the pressure differential value will be recorded. Such drop as sensed by device 65 will cause a corresponding impulse to be transmitted to Latch-In relay 74. A detailed description of the operation of the Delta P device 65 and Latch-In relay 74 will be given as the description of the invention proceeds. In general this relay functions as follows:

Whenever the combustion efficiency is lowered while an increase in air is demanded by device 60, more fuel will be called for by relay 74 through an impulse sent to the fuel valve activator 64 causing fuel valve 54 to admit more fuel. Such increase will raise the combustion efficiency, and will be indicated by a rising pressure differential, which when reported by Delta P device 65 to Latch-In relay 74 will cause the increase of fuel to cease. On the other hand, if the Latch-In relay 74 receives impulses from the Delta P device 65 which indicate a falling off of efficiency due to a decrease of air supply that is demanded and actually caused by device 60, impulses will be sent to the fuel supply valve 64 by the Latch-In relay 74 to reduce the flow of fuel to the furnace chamber 12 until a rising combustion efficiency is again reported by Delta P device 65, at which time such decrease of fuel will automatically cease.

Figure 5:
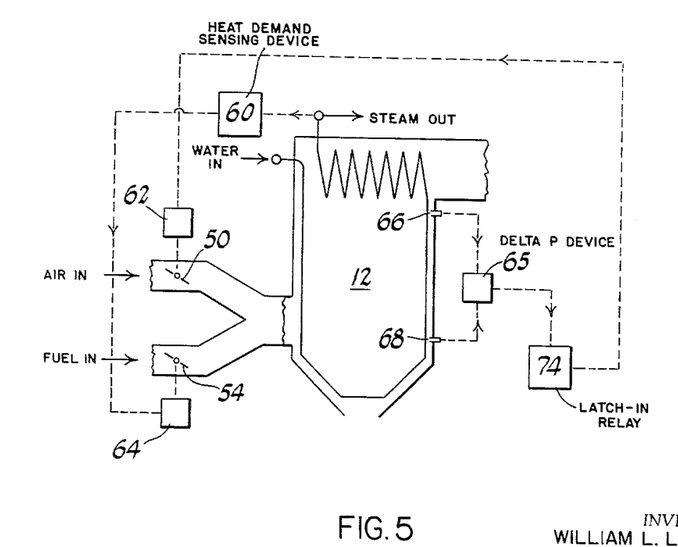
FIG. 5 is a simplified diagrammatic representation similar to that of FIG. 4, however, with heat demand determining the fuel flow rate, and the air flow rate being matched to the fuel flow rate by way of pressure differential indications.

In FIG. 5 is shown an alternate application of the invention. In the arrangement illustrated in FIG. 4 the heat demand or load demand impulse originating at 60 is received by the air damper actuator 62 for adjusting the air flow to the heat demand, and the fuel supply is then matched to the air supply by the Delta P device 65 to obtain maximum combustion efficiency. On the other hand, in FIG. 5 the heat demand impulse originating at 60 is transmitted to the fuel valve actuating device 64 for adjusting the fuel supply to meet the heat demand, and thereafter the air supply is matched to the fuel supply to obtain optimum combustion efficiency as sensed by the pressure differential device 65 in response to pressure indications taken at pressure taps 66 and 68. In either case, whether the air supply is first matched to the load demand and the fuel supply thereafter to the air supply, or whether the fuel supply is first matched to the load demand and then the air supply to the fuel supply, this hereindisclosed combustion control system continually asks the question: Is the fuel controller 64 or the air controller 62 being positioned so that the fire is producing a pressure differential value which is on the increase? If the answer is YES, then operating conditions are such as to better the combustion efficiency and no action is taken to change the performance of fuel controller 64 or air controller 62. If, on the other hand, the answer is NO, and the pressure differential value is on the decrease, indicating a falling off of the combustion efficiency, then the action of the fuel controller 64 or air controller 62 is reversed by Latch-In relay 74.

Figure 6:
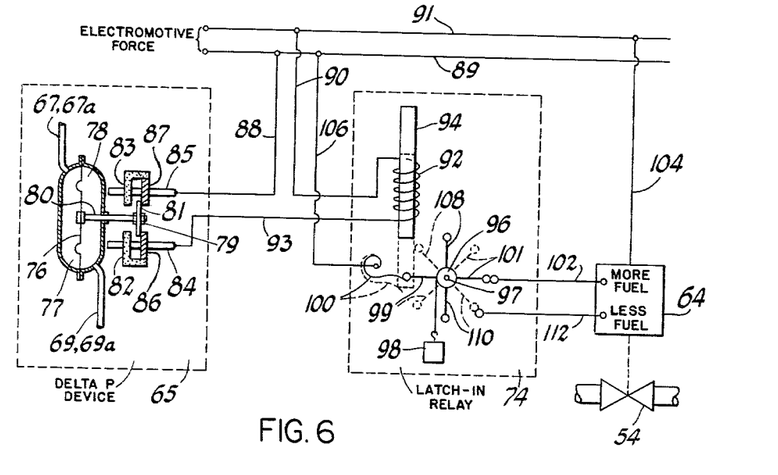
FIG. 6 is a detailed diagrammatic representation of the pressure differential indicating device or a Delta P device which produces an electric impulse when the Delta P or pressure differential is increasing, with such impulse being transmitted to a differentiating device such as a latch-in relay, also shown in diagrammatic form, both the Delta P devices and the latch-in relay cooperating in the manner disclosed in the hereindescribed combustion control system.

Although both the Delta P device 65 and the Latch-In relay 74 are well known control instruments which are commercially available, a description of a simplified mechanism of these co-acting devices as illustrated in FIG. 6 is included herein.

The left-hand portion of FIG. 6 diagrammatically depicts the Delta P device or switch 65, which comprises a diaphragm 76 forming a flexible wall between two pressure chambers 77 and 78 which are subject to the static pressure transmitted by conduits 67 or 67a and 69 or 69a, respectively. The conduits 67 and 69 are connected to pressure taps 66 and 68 mounted in the wall of furnace chamber 12, see FIG. 1, and the conduits 67a and 69a are connected to pressure taps 66a and 68a mounted on the walls of combustion chamber 13, see FIG. 2. As shown in FIG. 6, a rod 80 being provided with a bridge member 81 adjustably positioned at one end thereof and with the other end being fastened to diaphragm 76, follows the relative movement of diaphragm 76, such movements being caused by variations in the differential of the pressure momentarily prevailing in chambers 77 and 78. A pair of guide members 82 and 83 are slidingly supported on rods 84 and 85 and are made of electrically non-conducting material. Each of these guides carries a metallic and electrically conducting member 86 and 87, respectively, which members maintain an electric contact with sliding rods 84 and 85. The position of bridge member 81 on rod 80 can be so adjusted by positioning nuts 79 that when a predetermined pressure differential exists between the pressures in chambers 77 and 78, the member 81 is located midway between metallic contacts 86, 87 and the surface of non-metallic or non-conducting guide members 82, 83. If however the pressure in chamber 77 increases, or in other words the pressure differential between chamber 77 and chamber 78 increases, the rod 80 and bridge member 81 will move towards metallic members 86 and 87, make contact therewith and with continuing increase of the pressure differential the guides 82 and 83 will be pushed toward the right by member 81 as long as the pressure differential increases. As soon as contact is established by bridge 81 with members 86 and 87 an electric circuit will be closed which includes contact member 87, slide bar 85, conduit 88 connected to one pole 89 of an electromotive force, conduit 90 connected to the other pole 91 of the electromotive force, winding 92 being a part of an electromagnet or solenoid, conduit 93, slide bar 84 and metallic contact 86. As soon as the trend of the pressure differential between chambers 77 and 78 reverses from an increasing pressure differential to a decreasing pressure differential the direction of travel of rod 80 will reverse, contact will be broken between metallic members 86 and 87 thereby de-energizing winding 92. By making contact with non-conducting guides 82 and 83, these will now be pushed by bridge 81 towards the left maintaining the de-energized status of winding 92 until the pressure differential trend again reverses from a decreasing pressure differential to an increasing pressure differential. In this case, the travel direction of rod 80 will again be reversed, winding 92 again being energized by the closing of the switch between contacts 86 and 87, etc.

Turning now to the right-hand portion of FIG. 6, there is diagrammatically depicted the mechanism of Latch-In relay 74. An electromagnetic core 94 is being maintained in the position indicated in solid lines when winding 92 is energized. When winding 92 is de-energized the core 94 will drop by gravity to the position indicated in dash-dash lines. A star wheel 96 having four radial contact arms and being supported for rotation around axis 97 is urged to rotate in a counter-clockwise direction by a suitable force here represented by weight 98. As shown in solid lines, one radial arm 99 is in contact with and rests on the end of a leaf spring 100, the tension of which being just sufficient to support the force exerted by weight 98. At the same time another radial arm 101 shown in solid line makes contact with a conduit 102 leading to the one pole 91 of the electromotive force via fuel valve activating device 64 and conduit 104. An electric circuit is thereby established from the other pole 89 through conduit 106, leaf spring 100, radial arms 99 and 101, conduit 102, fuel activating device 64 and conduit 104 to pole 91. When the radial contact arms 99 and 101 are in the position shown in solid lines and with the electric current entering fuel valve activating device 64 by way of conduit 102, device 64, such as a reversible type motor, for instance, is organized to rotate in such a manner that fuel valve 54 is opened and more fuel is admitted to the furnace chamber. On the other hand the de-energizing of electromagnetic winding 92 will cause core 94 to drop by gravity and push radial arm 99 beyond the support of leaf spring 100, with the force exerted by weight 98 causing the star wheel 96 to rotate 45 degrees. This will bring radial arm 108 in contact with core 94 and radial arm 110 in contact with the terminal of conduit 112, with the other end of this conduit being connected to fuel valve activating device 64. An electric circuit is thereby established from pole 89 through conduit 106, leaf spring 100 (shown in dash-dash lines), core 94 (shown in dash-dash lines), radial arms 108 and 110 (shown in dash-dash lines), conduit 112, fuel valve activating device 64 and conduit 104 to pole 91. When the radial arms 108 and 110 are in the above-described positions as shown in dash-dash lines and with an electric current flowing through fuel valve activating device 64 by way of conduit 112, device 64 is energized in a manner which will reverse direction of rotation of activating device or reversible motor 64, so that fuel valve 54 is being activated toward a closed position with less fuel thereby being admitted to the furnace.

In operation Delta P device 65 and Latch-In relay 74 cooperate as follows:

If the static pressure recorded at taps 66 and 68 (see FIGS. 1 and 4) and transmitted to chambers 77 and 78 (see FIG. 6) indicate a rising pressure differential, the rod 80 and contact member 81 of the Delta P switch will bridge contacts 86 and 87, energize the winding 92 of the solenoid in Latch-In relay 74, and thereby establish an electric current through conduit 102 causing more fuel to be admitted to the furnace. The rising pressure differential will prevail as long as the point 70a (see FIG. 3) moves upwardly along curve A1 and towards the optimum efficiency point 70. As soon as the peak of efficiency has been reached at point 70 and point 70a reverses the trend by passing from an air rich region into a fuel rich region as indicated by point 70f, the combustion efficiency will be on the decline as reflected by a descending pressure differential which when sensed by the Delta P device 65 will cause the movement of rod 80 and bridge 81 to reverse and with bridge 81 now breaking contact with contacts 86 and 87 cause a de-energizing of winding 92, a dropping of core 94, breaking of contact between radial arm 99 and leaf spring 100, and between radial arm 101 and conduit 102, establish contact between radial arm 108 and core 94, and between radial arm 110 and conduit 112. The above action will now permit an electric current to flow through conduit 112 and cause fuel valve actuating device 64 to restrict the opening of valve 54 and admit less fuel to the furnace chamber. Such a decrease in fuel will then affect an increase in combustion efficiency as indicated by a reversal of the downward direction of travel of point 70f upwardly toward optimum efficiency point 70.

While the preferred embodiment of my invention makes use of a combustion efficiency index based on the difference in the static pressure measured at two points in the combustion chamber, a combustion efficiency index based on electromagnetic wave emissions can also be employed with great benefit in connection with my invention.

Figure 7:
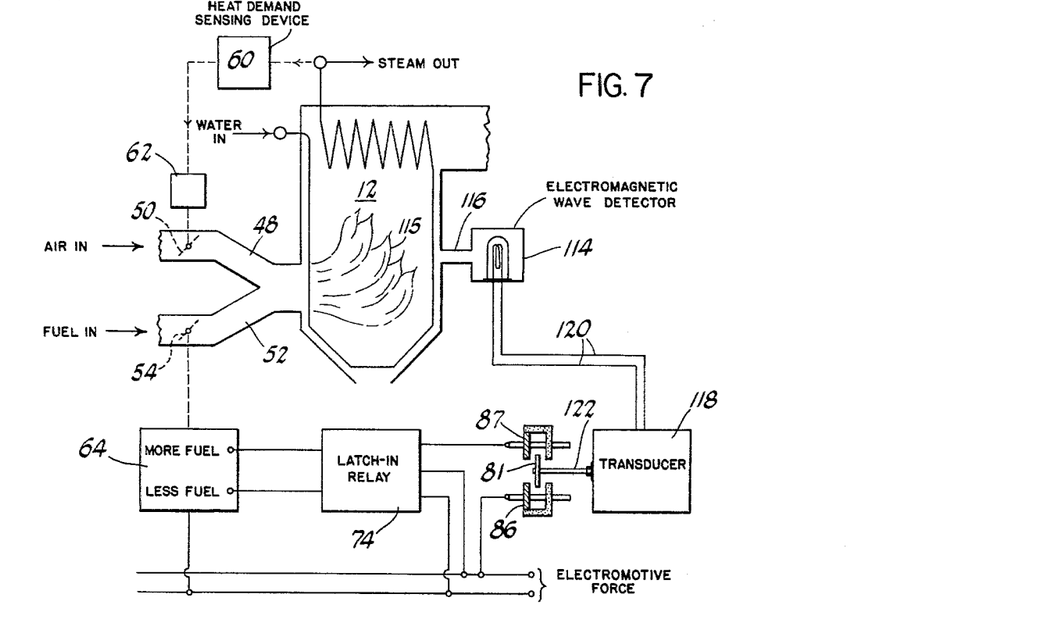
FIG. 7 is a diagrammatic and partial representation of a steam power plant showing an electromagnetic wave detector, or heat sensing device acting as the combustion efficiency index and being employed in connection with my novel combustion control system, instead of a Delta P device.
Figure 8:
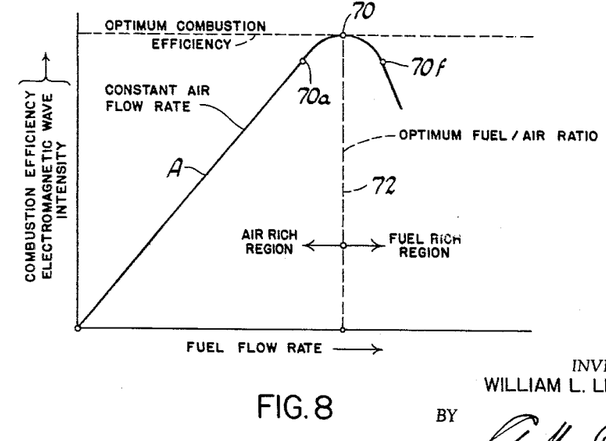
FIG. 8 is a diagram showing constant air flow rate being plotted against an abscissa scale of variable fuel flow rate, and on an ordinate scale of variable electromagnetic wave intensities as an index of combustion efficiency.

Thus in FIG. 7 a steam boiler is shown in diagrammatic form having a furnace 12 supplied with combustion air by way of a duct 48 and with fuel by way of conduit 52. Control means 50 and 54, respectively, are provided to regulate the air flow and the fuel flow with these control means being activated by air controller 62 and fuel controller 64, respectively. As earlier described in connection with FIG. 1 variations in heat demand or load are received by heat demand receiver 60 and are transmitted to air flow regulator 62 to apportion the flow rate of the combustion air in response to the heat demand. Such change in air flow will upset the previously established fuel-air ratio and result in a decline of the combustion efficiency. To sense such change in combustion efficiency an electromagnetic wave detector 114 is provided in a suitable position in the furnace wall and receives variations of electromagnetic wave emissions from the flame body 115 by way of a sighting tube 116. Corresponding electric impulses are then transmitted from wave detector 114 to a transducer 118 by way of conduits 120. These electric impulses are translated into mechanical motion transmitted by rod 122 which performs the same function as rod 80 in FIG. 6. As rod 80, rod 122 is provided with a bridge member 81 to serve the same purpose as earlier described in connection with FIG. 6. Thus a decrease in electromagnetic wave intensity of the flame body, as sensed by device 114 and being identical with a lowering of the combustion efficiency, will cause rod 122 and member 81 to move toward the left and bridge metallic members 86 and 87. A circuit is thereby closed which energizes Latch-In relay 74 and causes an increase of the fuel supply rate by means of fuel flow control devices 64 and 54. This action is diagrammatically illustrated in FIG. 8 which is similar to FIG. 3. A curve A representing a constant air flow rate such as pounds per hour is plotted against a rising fuel flow rate and a rising combustion efficiency as sensed by electromagnetic wave intensities. Point 70, in the same manner as in FIG. 3, represents the optimum combustion efficiency at the most favorable fuel-air ratio. Admission of more air beyond this optimum fuel-air ratio, and in response to a larger heat demand, will reduce the combustion efficiency as indicated by point 70a. Subsequent feeding of more fuel in response to impulses received from electromagnetic detector 114 as described hereinabove will cause a rise of the combustion efficiency until point 70 is again reached. If still more fuel is added the combustion efficiency will decline and point 70 will move into the fuel rich region, i.e., in direction of point 70f. Such decline of the combustion efficiency as reflected by a decline of the electromagnetic wave intensity sensed by detector 114, will reverse the travel of rod 122 and bridge 81, thereby breaking the contact with metallic members 86 and 87. A circuit is herewith energized in Latch-In relay 74 in the same manner as earlier described in connection with FIG. 6. This causes less fuel being fed to furnace 12 and reverses the downward trend of the combustion efficiency until point 70 is again reached, see FIG. 8.

While in the proceeding descriptions the fuel flow rate is being adjusted by the Latch-In relay in the manner indicated in FIGS. 1, 2, 4 and 7, my control system will yield equal benefits if the Latch-In relay is organized to adjust the air flow as indicated in FIG. 5, instead of the fuel flow. The disclosed system functions to reverse the fuel flow or air flow adjustment action whenever the combustion efficiency index such as the pressure differential value or electromagnetic wave intensity, is decreasing. At start-up of the unit, after the air flow is set in response to the heat demand or load demand, for example, the fuel flow is increased as long as the combustion efficiency index is increasing. When too much fuel is introduced into the furnace for optimum efficiency, the combustion efficiency index value will decrease and the fuel control action will reverse. As the fuel supply is decreased the combustion efficiency index value will increase. On the other hand, if too little fuel is introduced for optimum combustion efficiency then the combustion efficiency index value will decrease. The action of the fuel control system will then reverse and send the combustion efficiency index value up, etc. Obviously correspondingly similar actions are initiated, whether the heat demand impulses are first received by the air flow activator 62 as indicated in FIG. 4 or by the fuel flow activator 64 as indicated in FIG. 5.

The successful functioning of my control system is based on the fact that for any given air or oxygen flow there is an ideal fuel flow or heat release resulting in the highest practically obtainable combustion efficiency. Such highest combustion efficiency produces highest gas temperature for any given fuel quantity. This in turn results in the greatest density difference and accordingly in the highest pressure differential or electromagnetic wave intensity response. After the optimum combustion efficiency is obtained any change in either the fuel flow rate or the air flow rate will decrease the combustion efficiency index, whether such index is based on pressure differential values, electromagnetic wave intensity readings or other suitable combustion efficiency index. A drop in the combustion index value would then call for an adjustment of either the fuel flow or the air flow depending on which arrangement is being used, that shown in FIG. 4 or that shown in FIG. 5.

As earlier indicated herein, there are still other combustion efficiency indices which could suitably be employed in connection with my inventive control system. These indices include thermal couple probes or other heat measuring devices such as using the furnace as a calorimeter. Since these devices are conventional and well known in the art a detailed description thereof seems to be superfluous.

My invention as hereinabove set forth accordingly provides many advantages over a conventional combustion control system. These advantages include the following desirable features:

(a) Controlling fuel and air by the herein disclosed Delta P system eliminates delays and inaccuracies that are inherent and required by the use of $CO_2$ and $O_2$ metering devices, which only sample products of combustion for the purpose of determining combustion efficiency after combustion has been completed. This conventional method requires time for cleaning, standardizing and testing the sample of combustion products before any corrective measures can be taken to improve combustion efficiency;

(b) The hereindisclosed combustion control system eliminates the need for equipment to meter the air and the fuel rate, thus effecting a reduction in control equipment and cost;

(c) The inventive control system automatically increases the excess air required for low load operation at a time when an increase in air-fuel ratio is needed to assure complete combustion;

(d) My invention automatically corrects the air-fuel ratio when a change in fuel is made. Such change may involve a switching to an entirely different type of fuel or a change in the physical or chemical properties of the fuel being used.

While I have shown and described embodiments of the invention in connection with a steam generator operating in the subcritical pressure range and being of the natural circulation type, my invention can with equally beneficial results be applied to other types of steam generators or furnaces such as forced flow or once-through flow type steam boilers operating in the supercritical pressure range. Although control instruments of a specific type have been employed in describing the hereindisclosed control system other types of control instruments could be used in connection with the pressure differential or Delta P system or the electromagnetic wave detection system.

I claim:

1. A control system for controlling the supply of combustion elements to a steam boiler having a combustion chamber for generating heat, and in response to a varying heat load demand, comprising (1) means for supplying combustion elements to said chamber in the form of oxygen and fuel; (2) means for burning said fuel and producing combustion gases in a flame and combustion zone; (3) means for continually removing said combustion gases from said chamber; (4) means for sensing changes in the heat demanded from said combustion chamber; (5) means for controlling the amount of one of said combustion elements supplied to said chamber in response to said heat demand; (6) means for sensing changes in the differential in static pressure prevailing in said chamber at two points therein spaced from each other in the gas travel sense with one point being located within said chamber upstream of said flame and the other downstream of at least a portion thereof and the space between said points being unobstructed with respect to gas flow, said static pressure differential increasing with an increase in combustion efficiency and decreasing with a decrease in combustion efficiency; (7) means for regulating the amount of the other of said combustion elements supplied to said chamber in response to changes in said static pressure differential to obtain a maximum pressure differential for any given heat load; and (8) means for reversing any change in the amount of said other combustion element in response to a decrease in said static pressure differential to maintain optimum combustion efficiency at any given heat load.

2. The method of controlling the supply of combustion elements to a steam boiler having a combustion chamber for generating heat, and in response to a varying heat demand, comprising the steps of (1) supplying combustion elements to said chamber in the form of oxygen and fuel; (2) burning said fuel and producing a flame and combustion gases in a combustion zone; (3) continually removing said combustion gases from said chamber; (4) sensing changes in the heat demanded from said combustion chamber; (5) controlling the amount of one of said combustion elements supplied to said chamber in response to said heat demand; (6) sensing changes in differential of static pressure prevailing in said chamber at two points therein spaced from each other in the gas travel sense with one point being located within said chamber upstream of said flame and the other downstream of at least a portion thereof and the space between said points being unobstructed with respect to gas flow; and (7) increasing or decreasing the amount of the other said combustion elements supplied to said chamber in response to a rising static pressure differential and reversing said increase or decrease of supply of said other combustion element in response to a falling static pressure differential to obtain optimum combustion efficiency with varying heat demand.

3. The method of controlling the supply of combustion elements to a steam boiler having a combustion chamber for generating heat, and in response to a varying heat load demand, comprising the steps of (1) supplying combustion elements to said chamber in the form of oxygen and fuel; (2) burning said fuel and producing a flame and combustion gases in a combustion zone; (3) continually removing said combustion gases from said chamber; (4) sensing changes in the heat demanded from said combustion chamber; (5) controlling the amount of one of said combustion elements supplied to said chamber in response to said heat demand; (6) sensing changes in the differential in static pressure prevailing in said chamber at two points therein spaced from each other in the gas travel sense with one point being located within said chamber upstream of said flame and the other downstream of at least a portion thereof and the space between said points being unobstructed with respect to gas flow, said static pressure differential increasing with an increase in combustion efficiency and decreasing with a decrease in combustion efficiency; (7) regulating the amount of the other of said combustion elements supplied to said chamber in response to changes in said static pressure differential to obtain a maximum pressure differential for any given heat load; and (8) reversing any change in the amount of said other combustion element supplied to said chamber in response to a decrease in said static pressure differential to maintain optimum combustion efficiency at any given heat load.

4. In a steam boiler having a combustion chamber for generating heat, in combination, means for supplying combustion elements in the form of fuel and oxygen to said chamber for producing a flame and combustion gases in a combustion zone; means for removing said combustion gases from said chamber; means for sensing changes in combustion efficiency as reflected by a combustion index which comprises means for sensing the pressure differential in said chamber between at least two points within said chamber that maintain a mutual spaced relation in the combustion gas flow sense with one point being located within said chamber upstream of said flame and the other downstream of at least a portion thereof and the space between said points being unobstructed with respect to gas flow; and means for regulating the supply to said chamber of at least one of said combustion elements in response to said pressure differential, such as to maintain an increase or decrease of the supply of said one combustion element with a rising pressure differential, and reverse said increase or decrease of the supply of said one combustion element with a falling pressure differential, so as to maintain the optimum of combustion efficiency.

5. In a steam boiler having a combustion chamber for generating heat to satisfy a predetermined range of heat demand, in combination means for supplying fuel to said chamber; means for supplying combustion air to said chamber; means for the burning of said fuel and the production of a flame and combustion gases; means for discharging said gases from said chamber; means for sensing changes in combustion efficiency which comprises means for sensing the pressure differential within said chamber between two points in said combustion chamber, said points being mutually spaced in the combustion gas flow sense with one point being located within said chamber upstream of said flame and the other downstream of at least a portion thereof and the space between said points being unobstructed with respect to gas flow, means for sensing changes in heat demand; means for regulating the air supply in response to said changes in heat demand, said air regulation lowering the combustion efficiency; means for regulating the fuel supply in response to said reduction in combustion efficiency as sensed by said combustion efficiency sensing means, such as to maintain an increase or decrease of the supply of fuel with a rising pressure differential, and to reverse said increase or decrease of the supply of fuel with a falling pressure differential, so as to maintain optimum combustion efficiency.

6. In a steam boiler having a combustion chamber for generating heat to satisfy a predetermined range of heat demand, in combination means for supplying fuel to said chamber; means for supplying combustion air to said chamber; means for the burning of said fuel and the production of a flame and combustion gases; means for discharging said gases from said chamber; means for sensing changes in combustion efficiency which comprises means for sensing the pressure differential within said chamber between two points in said combustion chamber, said points being mutually spaced in the combustion gas flow sense with one point being located within said chamber upstream of said flame and the other downstream of at least a portion thereof and the space between said points being unobstructed with respect to gas flow; means for sensing changes in heat demand; means for regulating the fuel supply in response to said changes in heat demand, said fuel regulation lowering the combustion efficiency; means for regulating the air supply in response to said reduction in combustion efficiency as sensed by said combustion efficiency sensing means, such as to maintain an increase or decrease of the supply of air with a rising pressure defferential, and to reverse said increase or decrease of the supply of air with a falling pressure differential, so as to maintain optimum combustion efficiency.

References Cited by the Examiner

UNITED STATES PATENTS

| | | | |
|---|---|---|---|
| 1,338,899 | 5/1920 | Brown et al. | 236—15 |
| 1,906,244 | 5/1933 | Benjamin. | |
| 2,306,073 | 12/1942 | Metcalf. | |
| 2,324,821 | 7/1943 | Campbell | 236—15 |
| 2,392,300 | 1/1946 | Ziebolz et al. | 236—14 X |
| 2,538,428 | 1/1951 | Sawyer | 23 |
| 2,666,584 | 1/1954 | Kliever | 236—78 X |
| 2,761,284 | 9/1956 | Malick. | |
| 2,777,289 | 1/1957 | Boucher. | |

OTHER REFERENCES

Cosgriff, Robert L.: Servos That Use Logic Can Optimize, in Control Engineering 2 (9), pp. 133–135, September 1955, TJ212C 6.

Waxman, A.: Fundamentals of Combustion Control Systems, in Instruments and Automation 27 (10), pp. 1636–1640, October 1954, Q 184 I 59.

WILLIAM F. O'DEA, *Acting Primary Examiner.*

ALDEN D. STEWART, EDWARD J. MICHAEL,
*Examiners.*